United States Patent [19]
Christofi

[11] Patent Number: 5,519,272
[45] Date of Patent: May 21, 1996

[54] WINDING CONNECTOR FOR A ROTARY ELECTRICAL COMPONENT

[75] Inventor: Kyriacos Christofi, Hempstead, United Kingdom

[73] Assignee: Lucas Industries PLC, Solihull, England

[21] Appl. No.: 207,873

[22] Filed: Mar. 8, 1994

[30] Foreign Application Priority Data

Mar. 10, 1993 [GB] United Kingdom .................... 9304871

[51] Int. Cl.[6] ................................................. H02K 11/00
[52] U.S. Cl. ............................ 310/71; 310/194; 310/269; 310/270
[58] Field of Search ............................. 310/71, 194, 269, 310/270

[56] References Cited

U.S. PATENT DOCUMENTS

| | | | |
|---|---|---|---|
| 3,675,058 | 7/1972 | Beddows et al. ........................... | 310/71 |
| 5,063,320 | 11/1991 | Watanabe et al. ........................ | 310/270 |
| 5,122,696 | 6/1992 | Shih et al. .................................. | 310/71 |
| 5,136,195 | 8/1992 | Allen III et al. .......................... | 310/68 |

FOREIGN PATENT DOCUMENTS 2382122  9/1978  France .

OTHER PUBLICATIONS

Soviet Inventions Illustrated, R. Section, week A36, Oct., 1978, Derwent Publications Ltd.

Primary Examiner—Steven L. Stephan
Assistant Examiner—Elvin Enad
Attorney, Agent, or Firm—Collard & Roe

[57] ABSTRACT

The rotary electrical component has first and second windings thereon and the connector comprises a body having first and second spaced apart sections which receive respective ends of the windings to be interconnected. An electrically conductive element extends between the two sections for connection to the winding ends. The sections include supports for resisting outward movement of the winding ends due to centrifugal force so as to reduce the likelihood of disconnection between the winding ends and the conductive element.

9 Claims, 4 Drawing Sheets

WINDING CONNECTOR FOR A ROTARY ELECTRICAL COMPONENT

The invention relates to a winding connector for a rotary electrical component, for example, a rotor of a brushless generator.

The invention is primarily concerned with a connector for windings in a two-pole aircraft electric generator of the kind which is designed to run at 24,000 rpm (to provide 400 Hz).

With such a two-pole generator, the rotor normally includes a core which is of generally I-shaped cross section to provide two salient poles around which two windings are wound. The windings are connected in series and, in order to do that, a free end of one of the windings at one end of the core is connected (typically brazed) to a free end of the other winding at the same end of the core. The high rotary speeds at which such generators normally run subject the brazed joint between the windings to high centrifugal loading which increases the possibility of fracture of the joint. Also, where the winding wire has been stressed by bending to facilitate making the joint, it is stressed still further by the centrifugal force. The repair of a fractured joint is very difficult since generally the broken winding ends are too short to rejoin readily. The dismantling and re-assembly of the aircraft generator is time consuming and expensive and an object of the present invention is to provide an improved form of connection between coil windings.

According to the invention there is provided a winding connector for a rotary electrical component having first and second windings thereon, the connector for the windings comprising a body having first and second spaced apart sections which receive respective ends of the windings to be interconnected and an electrically conductive element extending between the two sections and to which the winding ends are to be connected, said sections including means for resisting outward movement of the winding ends due to centrifugal force so as to reduce the likelihood of disconnection between the winding ends and the conductive element.

The conductive element preferably includes connector portions for connection to the respective winding ends such that one of the portions or ends respectively lies radially inboard of the other. Preferably, the connector portions of the conductive element lie radially inboard of the ends of the windings to be connected thereto. In such a case, the end sections of the windings will lie between the connector portions and the support means.

The aforesaid connector portions and the support means are preferably arranged so as to extend in a direction axially of the rotor.

The body is preferably T-shaped in cross section in the direction axially of the rotor so as to comprise a flange which extends transversely of the rotor and a web which extends axially of the rotor. Preferably, the ends of the windings to be received at the spaced apart sections of the connector extend through apertures formed in the flange on opposite sides of the web. The apertures preferably include counterbores which accommodate insulation on the ends of the windings.

In use, the winding connector may be arranged such that the flange has its underside positioned adjacent portions of the windings which pass across one end of the rotary component. To take into account a space in each of the windings which is created by the positioning of the free ends in the spaced apart sections of the connector, said flange may be formed with a thickened portion on each side of the web which lies in the associated space.

When viewed in the axial direction of the rotor, the connector is preferably I-shaped with the first and second spaced apart sections at opposite ends of the I.

The aforesaid electrically conductive element may be moulded into the remainder of the connector. A substantial portion of the electrically conductive element may lie within the aforesaid thickened portions.

A winding connector in accordance with the invention will now be described by way of example with reference to the accompanying drawings in which:

FIG. 1 is a diagrammatic cross sectional view through a known type of brushless generator, FIG. 2 is an elevation shown partly in cross-section of part of a two pole rotor for a generator as shown in FIG. 1, FIG. 3 is an end view of the rotor shown in FIG. 2 looking in the direction of arrow III in FIG. 2 and showing a known way of connecting its windings in series, FIG. 4 is an elevation of the rotor including an outer sleeve and an end cover, FIG. 5 is an end view of the rotor in FIG. 4 looking in the direction of arrow V in FIG. 4, FIG. 6 is a perspective view of a winding connector in accordance with the present invention;

Figure 1:
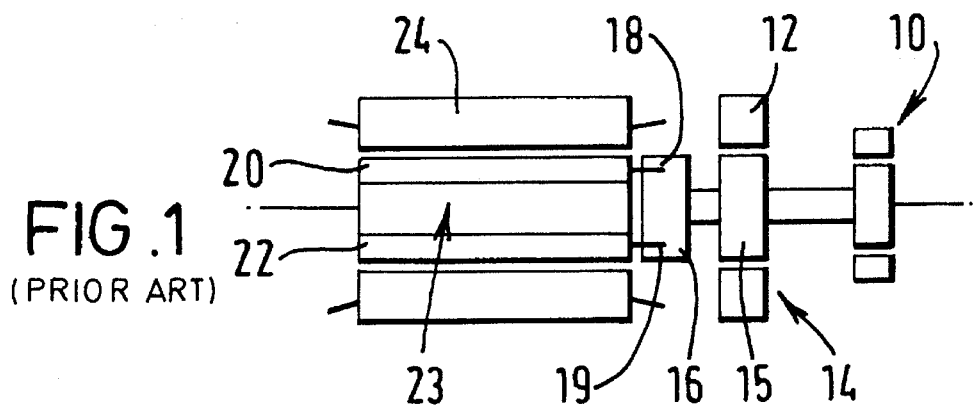
Figure 2:
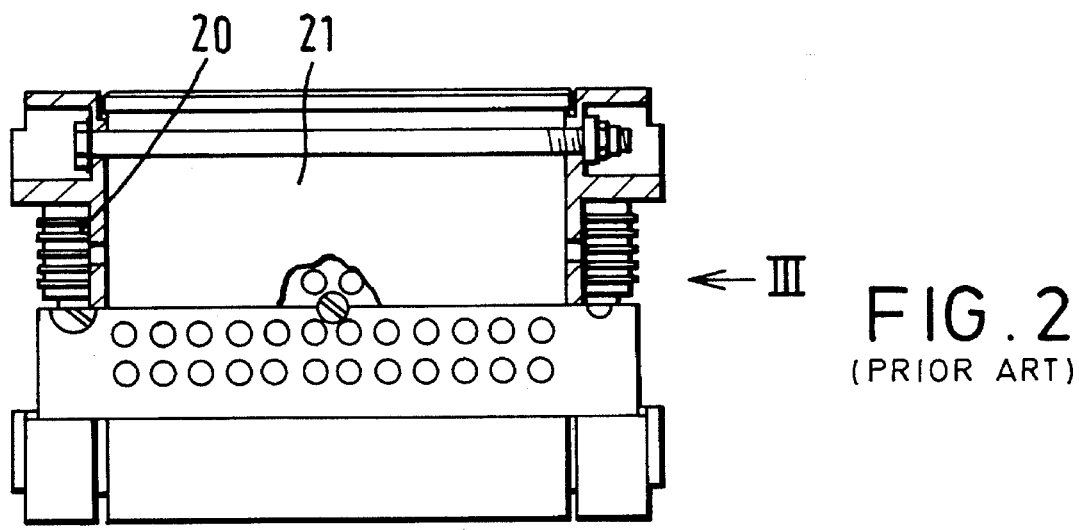

With reference to FIG. 1, a permanent magnet generator 10 applies current to a stator 12 of an exciter generator 14. Alternating current induced in a rotor 15 of the exciter generator 14 is supplied to a rectifier arrangement 16. The rectifier 16 has positive and negative terminals which supply current to positive and negative ends 18, 19 of two windings 20, 22 of a rotor 23. The windings are arranged in a series in known manner with their other ends connected together. Main generator output power is supplied from a stator 24 having windings which co-operate with the rotating magnetic field provided by the rotor 23. The present invention is concerned with the connecting together of the said "other ends" of the windings to connect the windings 20, 22 in series.

Figure 3:
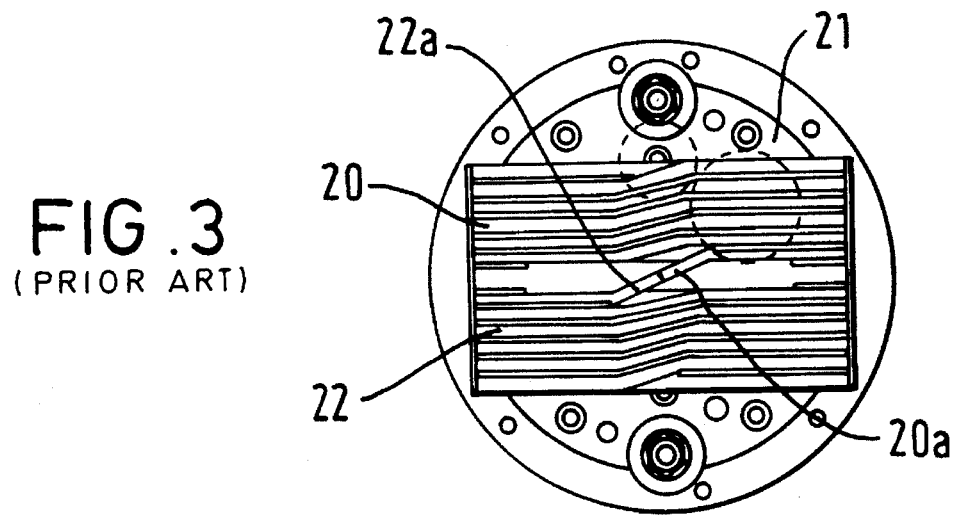
Figure 4:
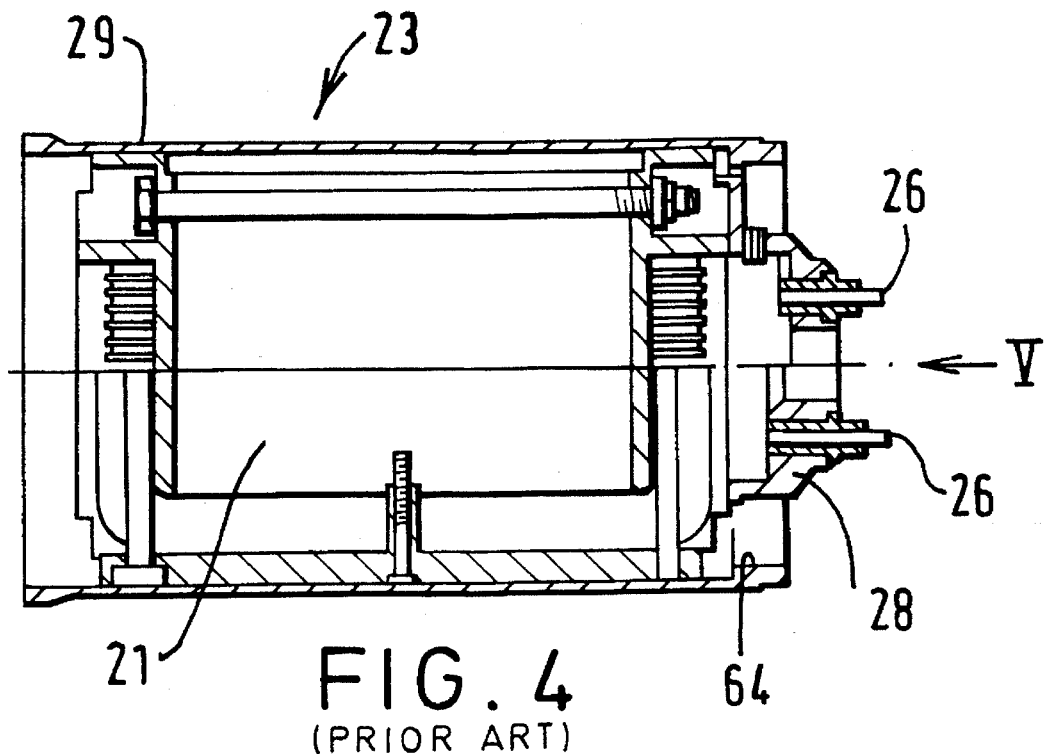
Figure 5:
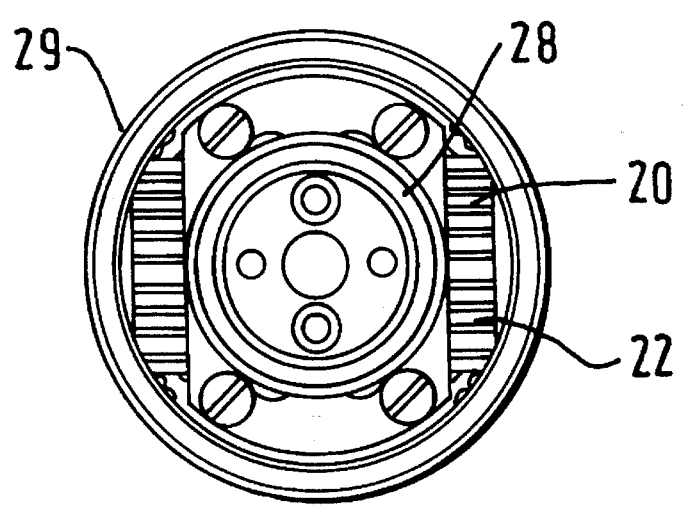

Reference is now made to FIGS. 2 to 5 which show a known form of core 21 for use in the rotor 23. The core 21 is of generally I-shaped cross section to provide two salient poles around which the windings 20, 22 are wound. In FIG. 3, ends 20a, 22a of windings 20, 22 are brazed together to join the two windings in series. The positive and negative ends 18, 19 of the windings are connected to pins 26 (FIG. 4) which are located in apertures in a rotor cover 28. The core 21 is contained within a close fitting outer sleeve 29.

The brazed joint between the ends 20a, 22a is subject to substantial centrifugal force and an object of the present invention is to provide an improved manner of connecting those ends together.

Figure 6:
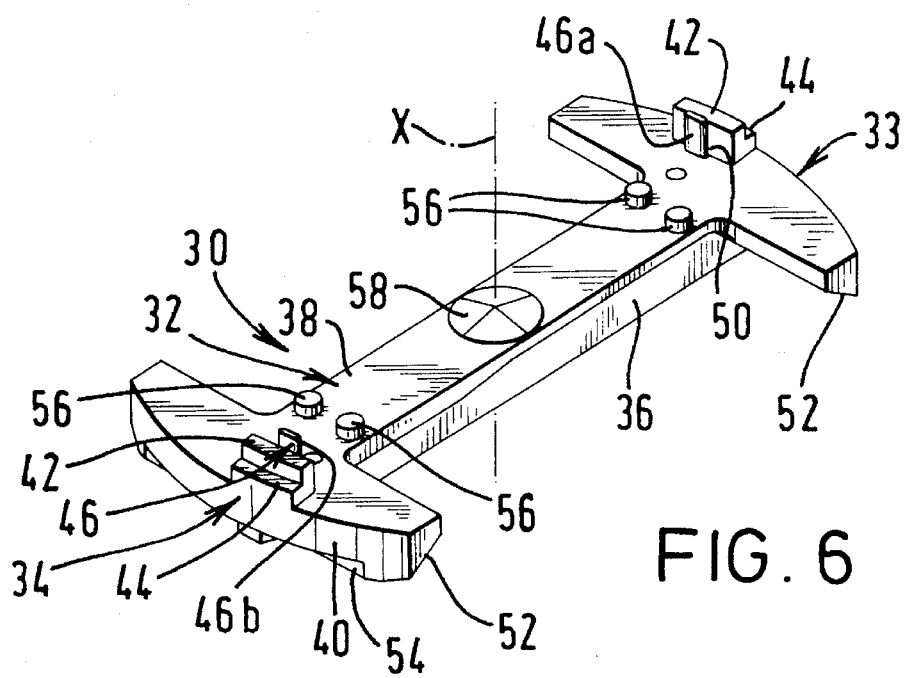
Figure 7:
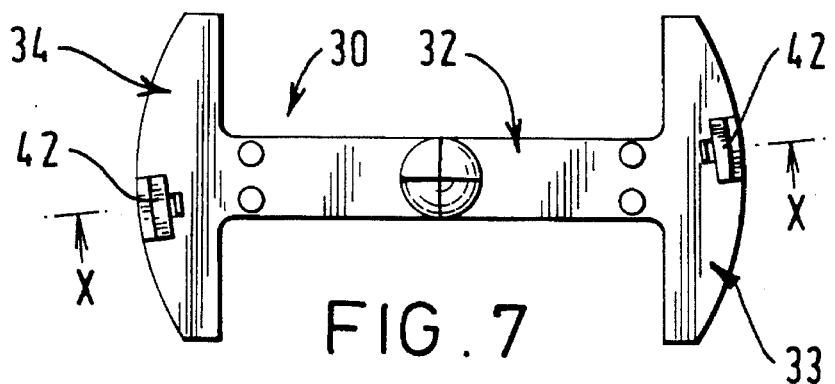
FIG. 7 is a plan view of the connector shown in FIG. 6.

Reference is now made to FIG. 6. which is a perspective view of a winding connector 30 in accordance with the invention.

The winding connector 30 is generally I-shaped when viewed along the axis of rotation of the rotor (indicated at X) having an elongate body 32 and transverse end sections 33, 34.

Figure 9:
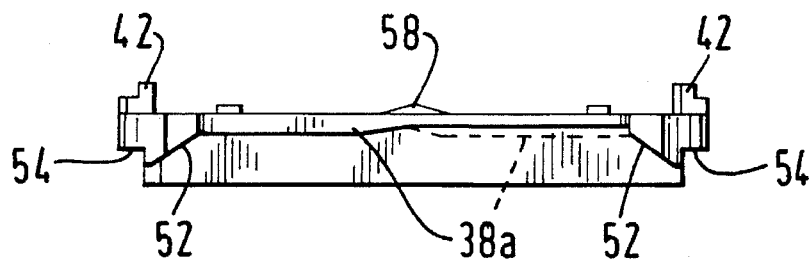
FIG. 9 is an elevation from one side of the connector shown in FIG. 7.
Figure 11:
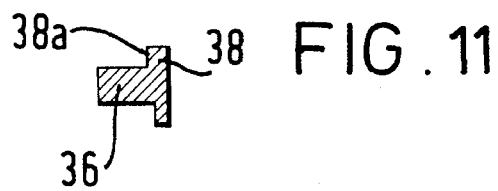
FIG. 11 is a transverse cross section through the connector on line XI—XI in FIG. 8.

The body 32 is of T-shaped cross section as apparent from FIG. 11. The T-shaped cross section comprises a vertical web 36 and a transverse flange 38. It will be noticed from FIG. 9 that the transverse flange 38 on each side of the web 36 has thickened sections 38a.

Figure 10:
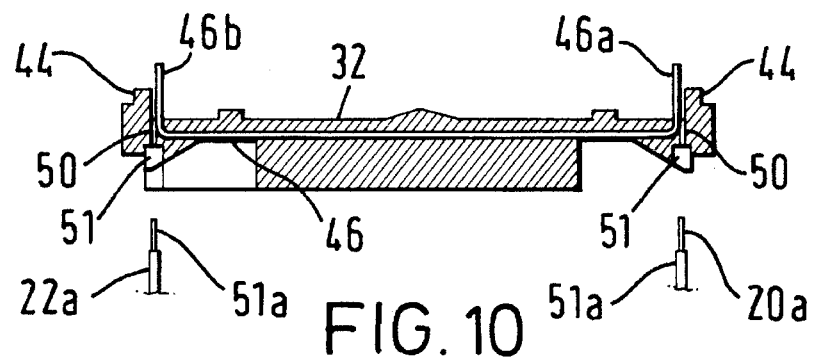
FIG. 10 is a longitudinal cross section through the connector on line X—X in FIG. 7 showing winding ends about to be inserted in the connector.

Each transverse end section 33, 34 has a cylindrical periphery 40 having a support 42 thereon formed with a step 44. A conductor 46 (constituting the aforesaid electrically conductive element) in the form of a strip of copper or other metal (see in particular FIG. 10) extends through the body 32 and is formed with connector portions comprising upwardly projecting ends 46a, 46b which pass through the respective transverse ends 33, 34. Immediately behind the ends 46a, 46b are two apertures 50. The apertures 50 extend through the material of the connector 30 one each side of the web 36 and communicate between the upper surface of the connector as viewed in FIGS. 6 and 10 and respective counterbores 51 which extend from the underside of the connector.

The underside of each of the transverse sections 33, 34 is formed with an inclined surface 52 and a step 54. The upper surface of the connector 30 is formed with two pairs of upwardly projecting studs 56 and is also formed with a central shallow pyramid 58 which helps to distribute fluid introduced axially of the rotor 23 for cooling purposes.

Figure 8:
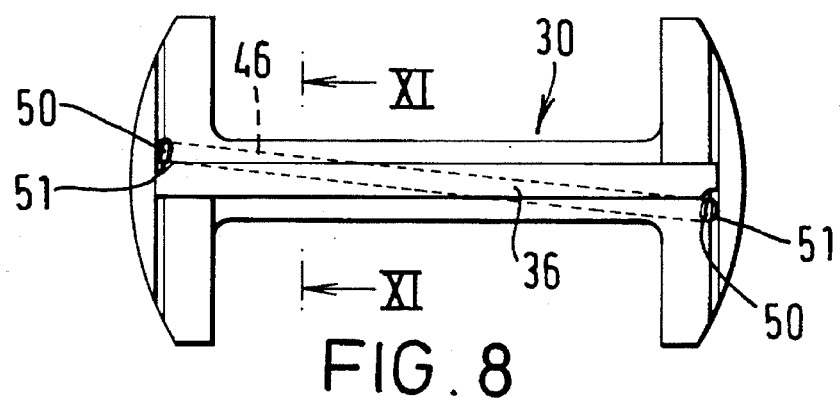
FIG. 8 is a underplan view of the connector shown in FIG. 7.
Figure 12:
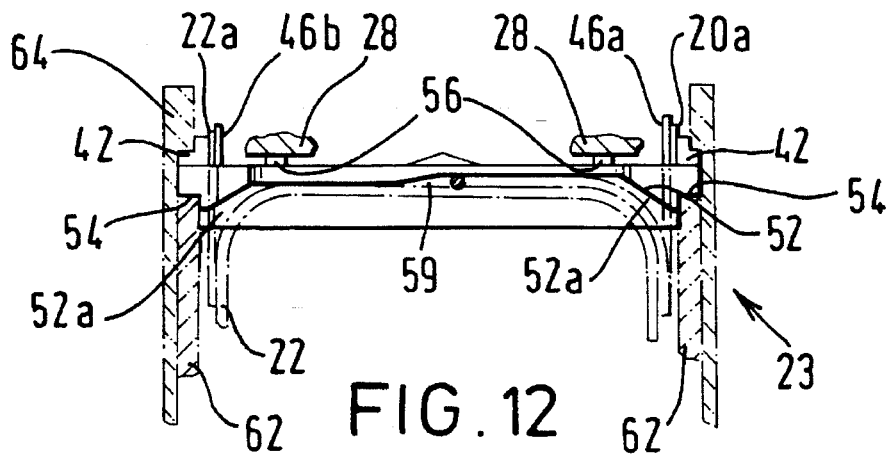
FIG. 12 is a longitudinal section through part of the rotor showing the connector of FIGS. 6–11 in position.

In use, the free ends 20a, 22a of the coils 20, 22 are passed through the apertures 50 so as to extend upwardly between the upwardly projecting ends 46a, 46b and the supports 42 as in FIG. 12. The free ends 20a, 22a are then brazed to the respective upwardly projecting ends 46a, 46b of metal strip 46. Insulation 51a (FIG. 10) on the free ends 20a, 22a of the windings lies within the counterbores 51 so that there is no risk of shorting over the wedge parts 52 when the brazing takes place and insulation melts, the counterbores 51 filling with molten insulation which subsequently sets. The web 36 is positioned between the two windings 20, 22. It will be noted from FIG. 12 that the thickened portion 38a of each flange 38 occupies a space 59 which would otherwise have been occupied by the free end of its winding if that free end had been joined to the other after the manner shown in FIG. 3. By occupying the spaces 59, the thickened portions 38a of each flange 38 prevents the wires which pass across the end of the core from moving into the space. Also, it will be noted from FIG. 8 that the metal strip 46 extends somewhat diagonally through the elongate body 32. In that way, a substantial part of the metal strip 46 is arranged to lie within the thickened portions 38a each side of the web 36 which is useful for insulating the strip whilst enabling the general thickness of the flange 38 to be kept to a minimum. The inclined faces 52 define with corners of the windings, as they bend around the core to pass along the sides thereof, a passage 52a which enables cooling fluid to pass along the windings axially of the rotor. Steps 54 locate on wedges 62 which are positioned in known manner over the sides of the windings 20, 22. The projections 56 abut the rotor end cover 28 to ensure firm retention of the connector 30. The projections 56 will normally be oversize in depth and will be manually trimmed during assembly to ensure a close fit between the cover 28 and the upper ends of the projections 56 so as to hold the connector firmly in position against the wedges 62.

The steps 44 receive a surface 64 (see FIGS. 4 and 12) formed on the outer sleeve 29 of the rotor.

By providing the connector 30, the free ends 20a, 22a can pass substantially directly into the apertures 50 without having to bend them inwardly to any great extent for connection as in FIG. 3. Moreover, once connected to the upwardly projecting ends 46a, 46b of the copper strip 46, the free ends 20a, 22a are positioned firmly between the projection ends and the adjacent inwardly facing surfaces of the supports 42. The supports 42 then resist any tendency for brazed together ends 20a, 46a and 22a, 46b to move outwardly due to centrifugal force. In fact, centrifugal force will tend to urge the projections 46a, 46b outwardly towards the free ends 20a, 22a to hold them together even more firmly.

The connector may conveniently be made as a one-piece plastics moulding with the metal strip 46 moulded in situ.

The connector 30 substantially reduces the problems of repair of a broken joint in a generator as in FIG. 3. The winding ends on each side of the break may be trimmed and inserted through apertures 50 of a connector 30 and brazed to metal strip 46 to effect a repair.

I claim:

1. A winding connector for a rotary electrical component having first and second windings thereon, the connector for the windings comprising a body having first and second spaced apart sections which receive respective ends of the windings to be interconnected and an electrically conductive element extending between the two sections and to which the winding ends are to be connected, said sections including support means for resisting outward movement of the winding ends due to centrifugal force so as to reduce the likelihood of disconnection between the winding ends and the conductive element.

2. A winding connector according to claim 1 in which the conductive element includes connector portions for connection to the respective winding ends such that the connector portions are positioned relative to the ends of the windings to be connected thereto whereby the ends of the windings will lie between the connector portions and the support means.

3. A winding connector according to claim 2, in which the connector portions and the support means are arranged so as to extend in a direction axially of the rotary electrical component.

4. A winding connector according to claim 1 in which the body is T-shaped in cross section so as to comprise a flange which extends transversely of the rotary electrical component and a web which extends axially of the rotary electrical component.

5. A winding connector according to claim 4 in which the flange has apertures formed therein and the ends of the windings to be received at the spaced apart sections of the connector extend through the apertures with the web lying between the ends of the windings.

6. A winding connector according to claim 4 in which the winding connector is arranged such that the flange is positioned adjacent portions of the windings which pass across one axial end of the rotary electrical component.

7. A winding connector according to claim 6 in which to take into account a space in each of the windings which is created by the positioning of the free ends in the spaced apart sections of the connector, said flange is formed with a thickened portion which lies in the associated space.

8. A winding connector according to claim 1 in which when the connector is in use and when viewed in the axial direction of the rotary electrical component, the connector is I-shaped with the first and second spaced apart sections at opposite ends of the I.

9. A winding connector for a rotary electrical component having first and second windings thereon, the connector for the windings comprising a body having first and second spaced apart sections which receive respective ends of the windings to be interconnected and an electrically conductive element extending between the two sections and to which the winding ends are to be connected, said sections including support means for resisting outward movement of the winding ends due to centrifugal force so as to reduce the likelihood of disconnection between the winding ends and the conductive element, the body being T-shaped in cross section so as to comprise a flange which extends transversely of the rotary electrical component and a web which extends axially of the rotary electrical component, the flange having apertures formed therein and the ends of the windings to be received at the spaced apart sections of the connector extending through the apertures with the web lying between the ends of the windings, the apertures including respective counterbores which accommodate insulation on the ends of the windings.

* * * * *